Jan. 6, 1970 N. FREEDMAN 3,488,483
CONSTANT WRITING RATE VECTOR GENERATOR
Filed June 30, 1967
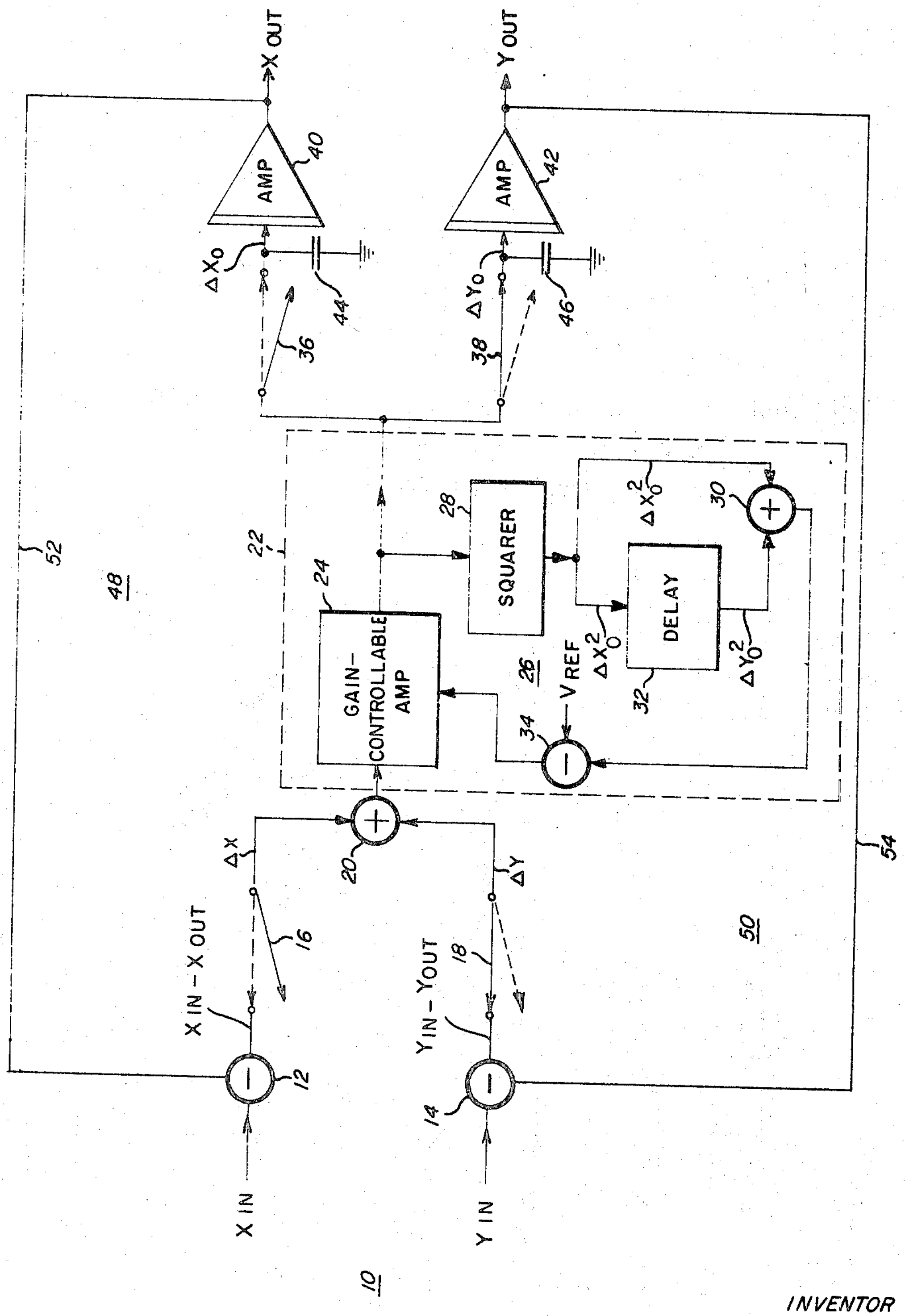
INVENTOR
NATHAN FREEDMAN
BY Irving S. Rappaport
ATTORNEY

3,488,483
CONSTANT WRITING RATE VECTOR GENERATOR

Nathan Freedman, West Newton, Mass., assignor to Raytheon Company, Lexington, Mass., a corporation of Delaware Filed June 30, 1967, Ser. No. 650,337
Int. Cl. G06g 7/22
U.S. Cl. 235—186 7 Claims

ABSTRACT OF THE DISCLOSURE

A vector generator which permits vectors to be drawn of any length at absolutely constant writing rates. Circuitry is provided which develops an error voltage function in both the X and Y axes which represents the difference between the actual and the command or desired position. The X and Y error voltages are commutated by electronic switching, then the signals are fed through a gain controllable amplifier which normalizes the writing rate, the output from the amplifier is decommutated by electronic switching and finally the error voltages are fed as rate controls to integrating amplifiers which reduce the error voltage functions to zero simultaneously and at a normalized rate.

BACKGROUND OF THE INVENTION

The problem of vector generation in a rectilinear coordinate framework, such as a cathode ray tube with fixed X and Y deflection systems, is to simultaneously reduce the component differences to zero in a smooth and continuous manner which guarantees that both the X and Y differences are reduced to zero simultaneously. In addition, for the special problem involved in a cathode ray tube display, it is desirable to keep the absolute closing rate constant in order to eliminate intensity variations due to writing rate changes. To solve this problem of vector generation, the difference between the actual and command positions should be converted to position error voltages which may then be integrated to provide a constant closing rate with correct heading. This problem has not been solved by the prior art.

The prior art is comprised of systems which employ open loop circuits for each of the X and Y axes. In such systems, the actual and command position information is sent through an arithmetic device to derive the DX (change in X) and DY (change in Y) signals which are then normalized, integrated and then summed with the actual position information. However, such systems result in an error in the end point which is proportional to the length of the vector drawn thereby making it necessary to draw the vector in discrete discontinuous segments so as to reduce the size of the error.

According to the present invention, a closed loop system is used for each of the X and Y axes which guarantees end point accuracy. In order to obtain the constant writing rate, it is necessary to provide quadrature addition of ΔX (the change in X) and ΔY (the change in Y) before normalization is applied. The key to this problem is to translate the X and Y signals into the time-frequency domain simultaneously with intermediate frequency (IF) techniques.

The present invention is characterized by the following features and advantages: (1) constant writing rate; (2) self determining writing time; (3) guaranteed terminal accuracy; (4) high reliability-minimum number of components; (5) single D.C. coupled channel for the dual function of spot positioning and line drawing; (6) easily adjusted writing speeds—permits adaptation of this approach to a variety of display devices; (7) fully flexible coding—any coordinates may be specified without restriction; (8) fully optimized operating cycles—the unit is ready to accept new coordinates as son as the beam reaches the commanded point; (9) minimized storage requirements—only terminal coordinates are necessary in storage; (10) controlled slew rates—slew rates are adjustable to stay within dynamic range of drive amplifiers; (11) continuous function—there are absolute no discontinuities in the output line regardless of length.

SUMMARY OF THE INVENTION

The above features and advantages of the present invention are achieved by providing a vector generator which permits vectors to be drawn of any length at absolutely constant writing rates. A signal normalizing circuit including a feedback loop is provided which develops an error voltage function in both the X and Y axes which represents the difference between the actual and the command or desired position. The X and Y error voltages are squared, summed and finally compared with a reference voltage in order to provide gain control. The net result is that the writing rate is held constant. Integrators reduce the error voltage functions to zero simultaneously and at a normalized rate.

BRIEF DESCRIPTION OF THE DRAWING

The figure shows a block diagram of the vector generator of the present invention.

DESCRIPTION OF THE PREFERRED EMBODIMENTS

A vector generator 10 is shown in a functional block diagram in the figure. The generator 10 includes a pair of X and Y differencing circuits 12 and 14 respectively which receive signals corresponding to a specific display coordinate which are labeled $X_{in}$ and $Y_{in}$. This command or desired position input information is periodically supplied from a digital data source whic his not shown. Also applied to the differencing circuits 12 and 14 are the actual position signals labeled $X_{out}$ and $Y_{out}$. Synchronous switches 16 and 18 are connected to the outputs of the differencing circuits 12 and 14 respectively. The outputs from the differencing circuits 12 and 14 respectively, represent $\Delta X(X_{in}-X_{out})$ and $\Delta Y(Y_{in}-Y_{out})$ respectively. The switches 16 and 18 have a switching rate or period T in the range of 1 to 10 mHz. depending on the smallest length vector to be written. Increasing the switching period T reduces transients. The error function signals ΔX and ΔY represent the difference in position between the command signal and the actual signal.

The ΔX and ΔY voltages are commutated by the switches 16 and 18 and are applied to a summing circuit 20 whose output is is a square wave. This square wave is applied to a signal normalizing circuit 22 which is outlined by the dotted rectangle. The normalizing circuit 22 include a video amplifier 24 to which the signal from the summing circuit 20 is directly fed. The amplifier 24 is gain-controllable over a wide dynamic range of approximately 60 db. The gain control of amplifier 24 serves to normalize the writing rate of a cathode ray tube trace by means of a feedback loop 26. The feedback loop 26 includes a squaring device 28, such as a simple diode, which has as an input $\Delta X_o$ or $\Delta Y_o$, the amplified signal from amplifier 24. The output from squaring device 28 is either $(\Delta X_o)^2$ or $(\Delta Y_o)^2$ depending on the instantaneous status of the switches 16 and 18. The squaring device 28 need not have much dynamic range because of the leveling effect of the automatic gain control feedback. The output from the squaring device 28 is split into two branches, one of which is connected directly to a summing circuit 30 and the other of which is coupled to the summing circuit 30 via a delay circuit 32. The delay circuit 32 delays the signal from the squaring device 28 for a period $T/2$ which is one half the switching period T. The undelayed waveform from the squaring device 28 and the delayed waveform from the delay circuit 32 are summed together in the summing circuit 30 to yield a D.C. output of $(\Delta X_0)^2+(\Delta Y_0)^2$ without any of the switching waveform. The output from the summing circuit 30 always yield $(\Delta X_0)^2+(\Delta Y_0)^2$ since regardless of whether the output from the squaring device 28 is $(\Delta X_0)^2$ or $(\Delta Y_0)^2$, the output from the delay circuit 32 is the other.

The output $(\Delta X_0)^2+(\Delta Y_0)^2$ from the summing circuit 30 is compared with a reference voltage, D.C. amplified if necessary in a combining or differencing circuit 34. The reference voltage is whatever value that it is desired to have $(\Delta X_0)^2+(\Delta Y_0)^2$ equal. The output from the differencing circuit 34, which is the difference between the reference voltage and $(\Delta X_0)^2+(\Delta Y_0)^2$, is fed back to the amplifier 24 thus completing the feedback loop 26 and serving as the gain control for the amplifier 24. The net result derived from the signal normalizing circuit 22 and the feedback loop 26 is that $(\Delta X_0)^2+(\Delta Y_0)^2$, which is proportional to the writing rate, is held constant.

The output from the signal normalizing circuit 22 is applied to synchronous switches 36 and 38 which decommutate the square wave output from the signal normalizing circuit 22. Integrating amplifiers 40 and 42 are connected to the switches 36 and 38 respectively. The amplified $\Delta X_0$ output from amplifier 24 is applied through switch 36 to the X-axis integrating amplifier 40 as an X-axis rate control and the $\Delta Y_0$ output from amplifier 24 is applied through the switch 38 to the Y-axis integrating amplifier 42 as a Y-axis rate control. The amplifiers 40 and 42 integrate the $\Delta X_0$ and $\Delta Y_0$ signals respectively thereby reducing the error functions to zero simultaneously. During operation of the circuit, the X-axis switches 12 and 36 are either both open or both closed at the same time as indicated by the solid and dotted arrows and the same is true of the Y-axis switches 14 and 42. Capacitors 44 and 46 are each connected between the inputs of the amplifiers 40 and 42 respectively and ground. These capacitors serve to hold the $\Delta X_0$ or $\Delta Y_0$ output signals respectively when the respective switch 36 or 38 is open thereby reducing the signal fluctuations to the inputs of amplifiers 40 and 42 respectively. The outputs from the amplifiers 40 and 42 are fed back through feedback loops 48 and 50 via lines 52 and 54 respectively to form the $X_{out}$ and $Y_{out}$ signals which are applied to the differencing circuits 12 and 14 respectively.

The circuit described in vector generator 10 including the video amplifier squaring device delay circuit, integrating amplifiers and the summing and differencing circuits are standard circuits for performing the various operations. Such circuits are shown and described in any standard electronics text such as "Electronic Fundamentals and Applications," Ryder, Second Edition, 1959.

It should be understood, of course, that the foregoing disclosure relates to only a preferred embodiment of the invention and that numerous modifications or alterations may be made therein without departing from the spirit and the scope of the invention.

I claim:

1. A vector generator with which vectors of any length may be drawn at constant writing rates, said generator comprising:
- means for combining X and Y axis components of a command position signal and an actual position signal producing X and Y axis error functions;
- means for normalizing said X and Y error functions;
- means for integrating said normalized X and Y axis error functions thereby reducing the error functions to zero simultaneously.

2. A vector generator as set forth in claim 1 wherein: said normalizing means includes a gain-controllable amplifier and a feedback loop between the output and input of said amplifier, said feedback loop provoding gain control for said amplifier in order to normalize the writing rate of said generator.

3. A vector generator as set forth in claim 2 wherein: said feedback loop includes:
- squaring means connected to the output of said amplifier for squaring the X and Y error functions;
- delay means for delaying the output of said squaring means;
- summing means for combining the delayed output of said squaring means with an undelayed output of said squaring means, the output of said summing means being the sum of the squares of the X and Y error functions, and
- combining means for taking the difference of the output from said summing means and a reference voltage, the output from said differencing means being applied to said amplifier as a gain control.

4. A vector generator with which vectors of any length may be drawn at constant writing rates, said generator comprising:
- differencing means for taking the difference between X and Y axis components of a command position signal and an actual position signal producing X and Y axis error functions;
- commutating means for alternately switching the X and Y axis error functions;
- means for normalizing said alternately switched X and Y axis error functions;
- decommutating means for producing X and Y axis rate controls from the output of said normalizing means;
- integrating means for reducing the decommutated X and Y axis rate controls to zero; and
- feedback means for applying the outputs from said integrating means back to said differencing means thereby obtaining new X and Y axis error function.

5. A vector generator as set forth in claim 4 wherein: said normalizing means includes a gain-controllable amplifier and a feedback loop between the output and input of said amplifier, said feedback loop providing gain control for said amplifier in order to normalize the writing rate of said generator.

6. A vector generator as set forth in claim 5 wherein: said feedback loop includes;
- squaring means connected to the output of said amplifier for squaring the X and Y error functions;
- delay means for delaying the output of said squaring means;
- summing means for combining the delayed output of said squaring means with an undelayed output of said squaring means, the output of said summing means being the sum of the squares of the X and Y error functions, and
- combining means for taking the difference of the output from said summing means and a reference voltage, the output from said differencing means being applied to said amplifier as a gain control.

7. A vector generator for use in conjunction with a cathode ray tube display system said generator capable of drawing vectors of any length at constant writing rates, said generator comprising:
- a pair of differencing circuits for taking the difference between X and Y axis components of a command position signal and an actual position signal producing X and Y axis error functions;
- a commutating synchronous electric switch connected to each of said differencing circuits for alternately switching between the X and Y axis error functions at a switching period T;

a summing circuit for combining the X and Y axis error functions from said switches;

a signal normalizing circuit connected to said summing circuit for normalizing said X and Y axis error functions, said normalizing circuit including:

a gain-controllable video amplifier; and a feedback loop between the output and input of said amplifier, said feedback loop providing gain control for said amplifier in order to normalize the writing rate of the cathode ray tube trace, said feedback loop including;

a squaring device connected to the output of said amplifier for squaring the X and Y axis error functions;

a delaying circuit for delaying the output of said squaring device for a period T/2;

a summing circuit for combining the delayed output of said squaring device with an undelayed output from said squaring device, the output of said summing circuit being the sum of the squares of the X and Y axis error functions; and a combining circuit for applying the difference between the output from said feedback loop summing circuit and a reference voltage to said amplifier as a gain control;

a pair of decommutating synchronous electronic switches connnected in parallel for receiving and decommutating the amplified X and Y axis error functions from the output of said normalizing circuit to produce X and Y axis rate controls;

an integrating amplifier connected to each of said decommutating switches for reducing the decommutated X and Y axis rate controls to zero; and feedback lines connected between each of the integrating amplifier outputs and the corresponding X and Y axis differencing circuits respectively for applying the signal outputs from said integrating amplifiers to said differencing circuits in order to obtain new X and Y axis error functions.

References Cited

UNITED STATES PATENTS

| | | | |
|---|---|---|---|
| 2,877,457 | 3/1959 | Gimpel | 235—186 |
| 2,894,685 | 7/1959 | Spencer et al. | 235—150 |
| 2,914,763 | 11/1959 | Greenwood et al. | 235—186 X |
| 2,938,671 | 5/1960 | Strom | 235—191 |
| 3,028,504 | 4/1962 | Close | 235—186 X |
| 3,109,128 | 10/1963 | Pruden et al. | 235—186 X |
| 3,334,298 | 8/1967 | Monrad-Krohn | 328—135 X |

MALCOLM A. MORRISON, Primary Examiner

ROBERT W. WEIG, Assistant Examiner

U.S. Cl. X.R.

235—192; 307—229; 328—148; 340—324

PO-1050
(5/69)

UNITED STATES PATENT OFFICE

CERTIFICATE OF CORRECTION

Patent No. 3,488,483 Dated January 6, 1970

Inventor(s) Nathan Freedman

It is certified that error appears in the above-identified patent and that said Letters Patent are hereby corrected as shown below:

Column 4, line 72, change "electric" to --electronic--
Column 6, line 2, change "to produce" to --producing--

SIGNED AND
SEALED
JUN 16 1970

(SEAL)
Attest:

Edward M. Fletcher, Jr.
Attesting Officer

WILLIAM E. SCHUYLER,
Commissioner of Patents